(12) United States Patent
Liu et al.

(10) Patent No.: US 11,413,592 B2
(45) Date of Patent: Aug. 16, 2022

(54) HORIZONTAL SUPERCRITICAL FLUID FOAMING AUTOCLAVE WITH INTERNAL STIRRING DEVICE

(71) Applicant: GUANGZHOU GREEN AND HEALTH BIOTECH CO., LTD., Guangzhou (CN)

(72) Inventors: Hancha Liu, Guangzhou (CN); Yuan Liang, Guangzhou (CN); Shuhua Wu, Guangzhou (CN); Jianyu Xu, Guangzhou (CN); Guohang Yang, Guangzhou (CN); Jitao Xu, Guangzhou (CN); Jiaqi Liang, Guangzhou (CN); Yuehua Liu, Guangzhou (CN); Yuhao Chen, Guangzhou (CN)

(73) Assignee: GUANGZHOU GREEN AND HEALTH BIOTECH CO., LTD., Guangzhou (CN)

( * ) Notice: Subject to any disclaimer, the term of this patent is extended or adjusted under 35 U.S.C. 154(b) by 97 days.

(21) Appl. No.: 17/016,407

(22) Filed: Sep. 10, 2020

(65) Prior Publication Data
US 2022/0072746 A1 Mar. 10, 2022

(51) Int. Cl.
*B01J 3/03* (2006.01)
*B01J 3/04* (2006.01)
(Continued)

(52) U.S. Cl.
CPC ............... *B01J 3/002* (2013.01); *B01J 3/008* (2013.01); *B01J 3/03* (2013.01); *B01J 3/042* (2013.01);
(Continued)

(58) Field of Classification Search
None
See application file for complete search history.

(56) References Cited

U.S. PATENT DOCUMENTS 3,667,649 A * 6/1972 Thillet .................... F17C 13/06
292/256.65
3,744,402 A * 7/1973 Piegza ...................... A23L 3/14
99/360
(Continued)

FOREIGN PATENT DOCUMENTS

CH 583064 A * 12/1976 ............... B01J 3/04
CN 111871330 A * 11/2020 ............... B01J 3/03
(Continued)

*Primary Examiner* — Jennifer A Leung

(57) ABSTRACT

The invention discloses a horizontal supercritical fluid foaming autoclave with an internal stirring device, comprising a horizontal autoclave body, an end cover, a stirring driver and a stirring paddle, wherein a stirring shaft of the stirring driver passes through the autoclave body and is connected with the stirring paddle positioned inside the autoclave body. The stirring driver of the invention can drive the stirring paddle to rotate, drive the fluid in the autoclave body to generate convection circulation, increase convection heat transfer, improve a uniform distribution degree of the temperature in the autoclave, enable the temperature in each position in the autoclave body to be consistent, ensure the consistency of the shape and parameters of foamed products, and improve the yield of the products.

9 Claims, 3 Drawing Sheets

(51) Int. Cl.
B01J 3/00 (2006.01)
B01J 19/00 (2006.01)
B29C 44/34 (2006.01)

(52) U.S. Cl.
CPC ....... B01J 19/0066 (2013.01); B29C 44/3453 (2013.01); B01J 2219/182 (2013.01)

(56) References Cited

U.S. PATENT DOCUMENTS

| | | | | |
|---|---|---|---|---|
| 5,127,535 | A * | 7/1992 | Shinno | F16J 13/10 220/323 |
| 5,158,986 | A * | 10/1992 | Cha | B29C 44/3446 521/97 |
| 2004/0080070 | A1* | 4/2004 | Liu | B29C 44/348 264/54 |
| 2008/0317647 | A1* | 12/2008 | Taricco | B01J 3/002 422/295 |
| 2010/0005710 | A1* | 1/2010 | Shaffer | C10L 5/26 44/632 |

FOREIGN PATENT DOCUMENTS

| | | | | |
|---|---|---|---|---|
| DE | 2900508 | A * | 7/1980 | ................ B01J 3/04 |
| DE | 19848148 | A1 * | 4/2000 | ........... B29C 44/105 |
| GB | 000341631 | A * | 1/1931 | ....... B32B 17/10834 |
| JP | 01055054 | A * | 3/1989 | .............. B01J 3/002 |

* cited by examiner

HORIZONTAL SUPERCRITICAL FLUID FOAMING AUTOCLAVE WITH INTERNAL STIRRING DEVICE

TECHNICAL FIELD

The invention relates to the technical field of foaming apparatus, in particular to a horizontal supercritical fluid foaming autoclave with an internal stirring device.

BACKGROUND ART

Supercritical fluid foaming technology has recently been introduced into the field of polymer material foaming. In order to stabilize product quality and improve production efficiency, this technology has great development space in process research, apparatus structure design and others. The structure design of supercritical fluid foaming autoclave is one of the key factors affecting product quality and production efficiency.

In the existing supercritical fluid foaming process, the control of the process temperature is realized by heating a heater in front of an autoclave and keeping the temperature of a jacket of an autoclave body. In the production process, due to the influence of factors such as fluid flow, inlet and outlet temperature gradients, jacket temperature differences and the like, the phenomenon that the temperature inside the autoclave body is uneven in an axial direction and a radial direction can occur, the quality and the yield of foamed products can be seriously influenced, for example, the shape and the size of the foamed products can be directly influenced, and the consistency of the shape and the size of the same batch of products can be directly influenced if the temperature values in all positions in the autoclave body are different greatly. Therefore, in the foaming autoclave, how to improve the uniform temperature distribution in the autoclave is a key technical problem to be solved in structural design.

SUMMARY OF THE INVENTION

It is an object of the present invention to overcome the defects in the prior art and to provide a horizontal supercritical fluid foaming autoclave with an internal stirring device, which can solve the problem of uneven temperature in an autoclave body.

To achieve the above object, the invention provides a horizontal supercritical fluid foaming autoclave with an internal stirring device, comprising an autoclave body, an end cover, a stirring driver and a stirring paddle, wherein the autoclave body is horizontally arranged, the interior of the autoclave body is hollow, one end of the autoclave body is opened to form an open end, and the other end of the autoclave body is closed to form a sealed end; the autoclave body is provided with a high-pressure fluid inlet and a high-pressure fluid outlet which are respectively communicated with the interior of the autoclave body, and the end cover is sealingly mounted inside the open end of the autoclave body to seal the open end of the autoclave body; and the stirring driver is axially mounted at the sealed end of the autoclave body, a stifling shaft of the stirring driver passes through the autoclave body and extends into the interior of the autoclave body, the stirring shaft is connected with the stirring paddle located in the autoclave body, and high-pressure self-tightening sealing is realized between the stirring driver and the sealed end of the autoclave body by a first sealing ring.

The stirring driver is eccentrically arranged with the axis of the autoclave body.

The stirring driver is provided as a magnetic stirrer.

A second sealing ring is arranged between the end cover and the inner wall of the autoclave body, and the end cover is sealingly arranged inside the open end of the autoclave body by the second sealing ring so as to realize high-pressure self-tightening sealing between the end cover and the autoclave body.

A heat-preservation jacket is arranged outside the autoclave body, a heat-preservation interlayer is formed between the heat-preservation jacket and the autoclave body, and a heat-preservation medium inlet and a heat-preservation medium outlet which are respectively communicated with the heat-preservation interlayer are arranged on the heat-preservation jacket.

A support for supporting is arranged outside the heat-preservation jacket.

A material frame is placed inside the autoclave body and fixedly connected with an inner end part of the end cover, the material frame is a frame type structure used for loading or hanging materials, and a guide wheel is arranged at the bottom of the material frame.

An outer end part of the end cover is provided with at least two wedge blocks and at least two wedge block driving devices, the inner wall of the open end of the autoclave body is provided with clamping grooves for clamping and matching with the wedge blocks, the wedge block driving devices are in transmission connection with the wedge blocks, and the wedge block driving devices can drive the corresponding wedge blocks to move in a radial direction, so that the wedge block can be clamped into the clamping groove of the autoclave body when the end cover is locked or can be separated from the clamping groove of the autoclave body when the cover is opened.

The wedge block is provided with five ones, the wedge block driving device is provided with five ones, each wedge block is respectively provided with an arc shape, the five wedge blocks can be combined to form an annular structure, and the clamping groove is formed to be an annular clamping groove.

The wedge block driving device is provided as an air cylinder.

Compared with the prior art, the invention has the following beneficial effects.

1. The stirring driver can drive the stirring paddle to rotate, drive the fluid in the autoclave body to generate convection circulation, increase convection heat transfer, improve a uniform distribution degree of the temperature in the autoclave, enable the temperature in each position in the autoclave body to be consistent, ensure the consistency of the shape and parameters of foamed products, and improve the yield of the products.

2. Due to the fact that the stirring driver is eccentrically arranged with the axis of the autoclave body, it is more favorable for the stirring paddle to promote the fluid in the autoclave to form convection.

DETAILED DESCRIPTION OF THE INVENTION

Figure 1:
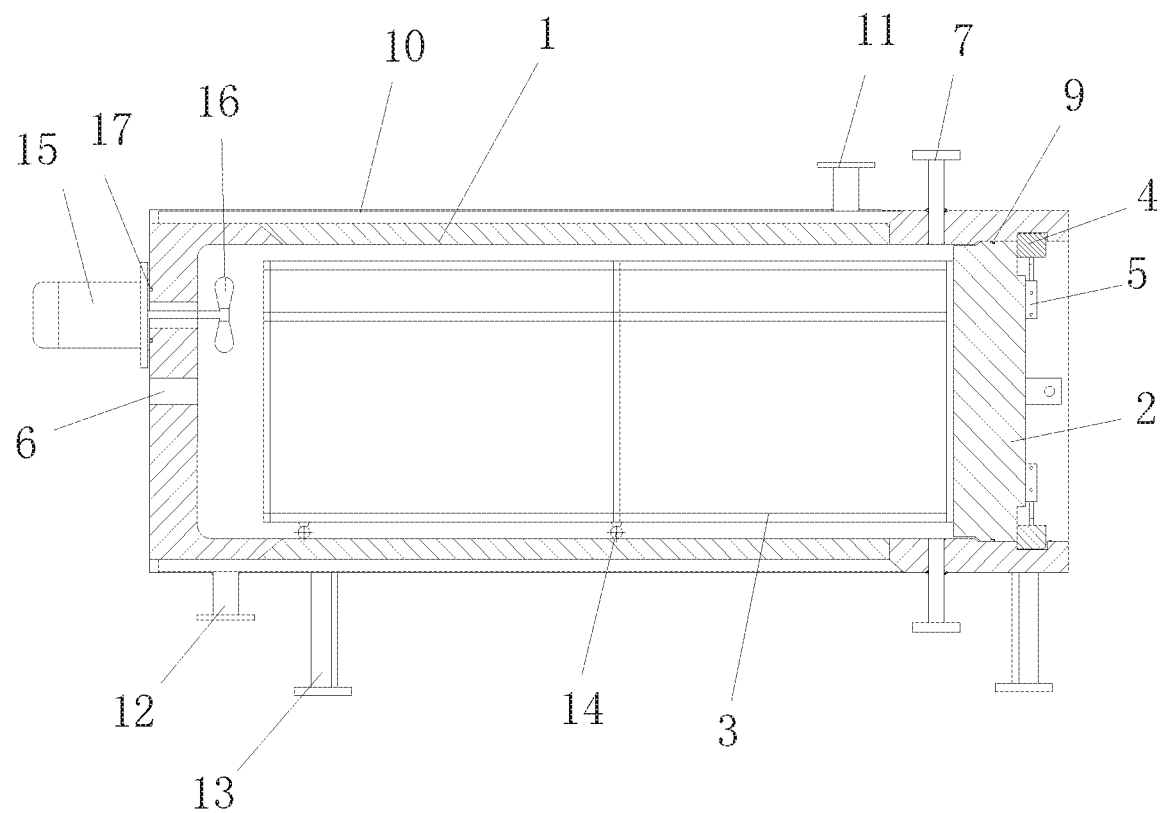
FIG. 1 is a structurally schematic view of a horizontal supercritical fluid foaming autoclave with an internal stirring device.

Referring to FIG. 1, an embodiment of the present invention provides a horizontal supercritical fluid foaming autoclave with an internal stirring device, comprising an autoclave body 1, an end cover 2, a stirring driver 15, a stirring paddle 16 and the like, and each of the components of the embodiment will be described in detail with reference to the accompanying drawings.

Figure 2:
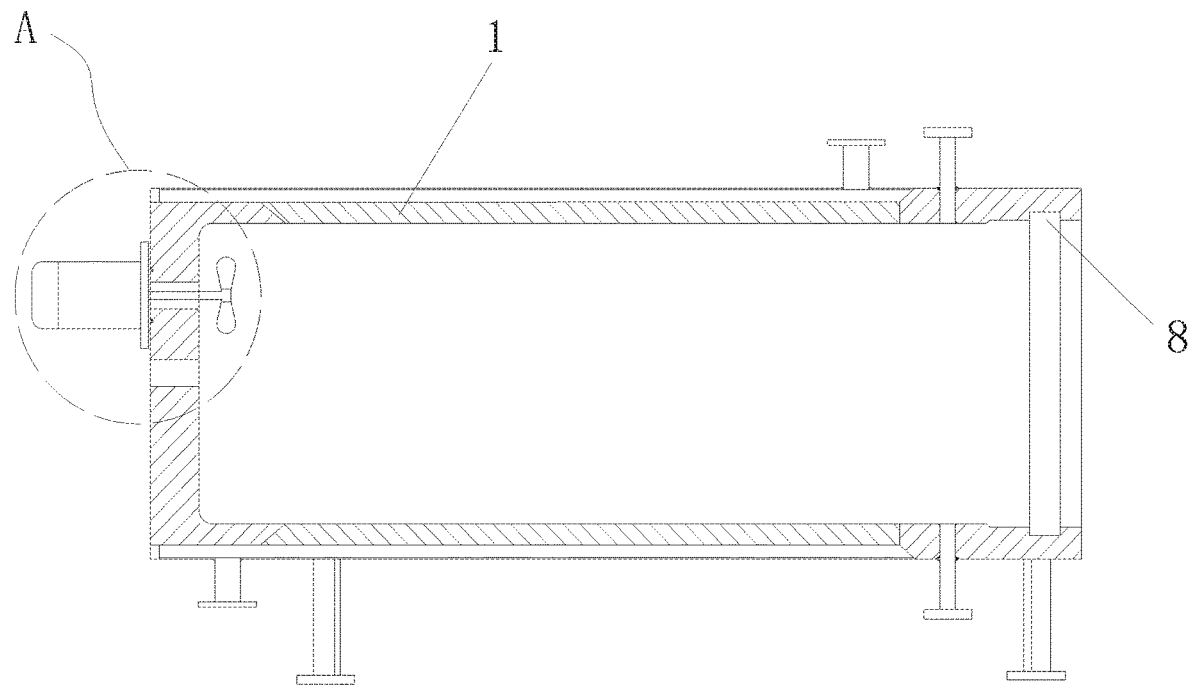
FIG. 2 is a structurally schematic view of an autoclave body.

As shown in FIGS. 1 and 2, the autoclave body 1 is horizontally arranged, so that loading operation, cleaning operation or other operations of materials are facilitated, the interior of the autoclave body 1 is hollow, one end of the autoclave body 1 is opened to form an open end, and the other end of the autoclave body 1 is closed to form a sealed end. In addition, the autoclave body 1 is provided with a high-pressure fluid inlet 6 and a high-pressure fluid outlet 7 which are respectively communicated with the interior of the autoclave body 1, the high-pressure fluid inlet 6 can be arranged at the sealed end of the autoclave body 1, and the high-pressure fluid outlet 7 can be arranged at the top and/or the bottom of the autoclave body 1 and close to the open end of the autoclave body 1.

Figure 4:
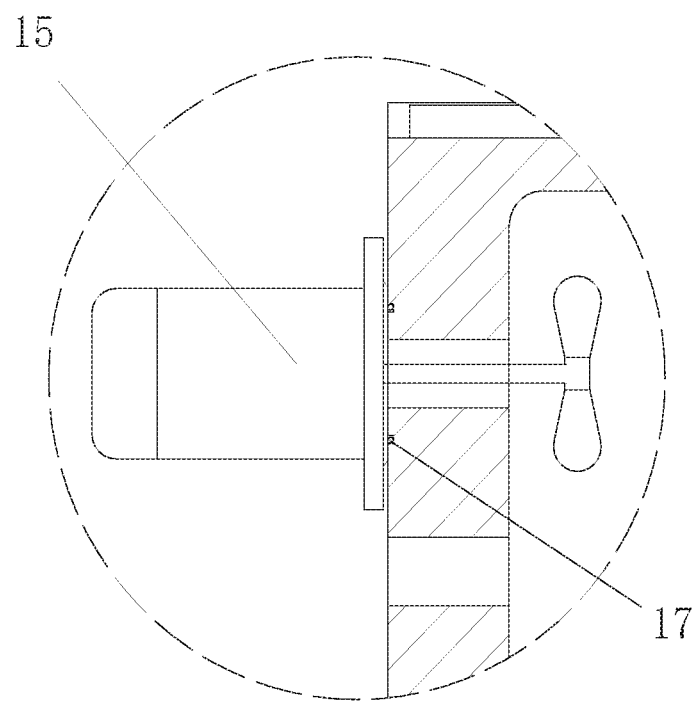
FIG. 4 is an enlarged view of a portion A of FIG. 2.

As shown in FIGS. 1 and 4, the stirring driver 15 is axially mounted at the sealed end of the autoclave body 1, the stirring shaft of the stirring driver 15 passes through the autoclave body 1 to extend into the interior of the autoclave body 1, the stirring shaft of the stirring driver 15 is connected with the stirring paddle 16 located inside the autoclave body 1, and the stirring driver 15 can drive the stirring paddle 16 to rotate. In this embodiment, the stirring driver 15 may preferably be provided as a magnetic stirrer.

Since the stirring shaft of the stirring driver 15 is required to pass through a hole position of the autoclave body 1, the high-pressure self-tightening sealing between the stirring driver 15 and the sealed end of the autoclave body 1 needs to be realized by the first sealing ring 17.

As shown in FIG. 1, the stirring driver 15 may be mounted eccentrically from the axis of the autoclave body 1. Due to the fact that the stirring driver is mounted eccentrically from the axis of the autoclave body, it is more favorable for the stirring paddle to promote the fluid in the autoclave to form convection.

Figure 3:
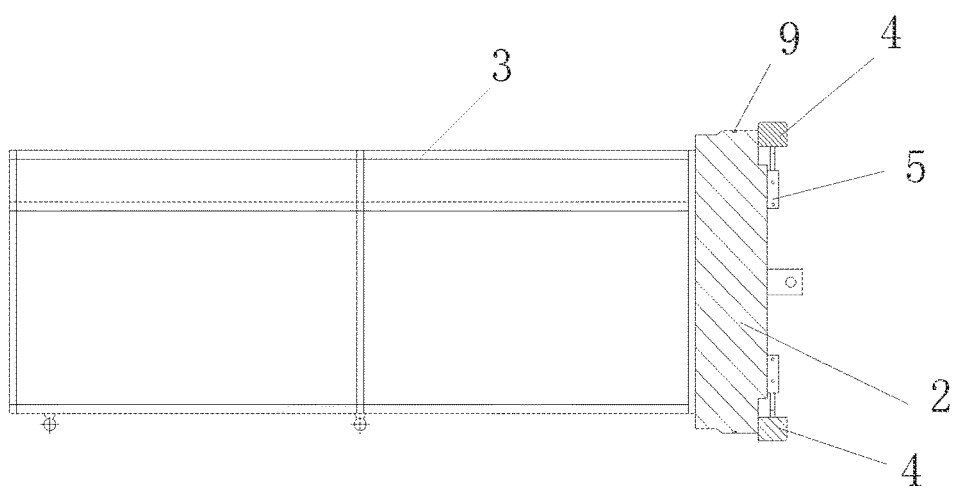
FIG. 3 is a structurally schematic view of an end cover and components attached to the end cover.

As shower FIGS. 1 and 3, the end cover 2 is sealingly arranged inside the open end of the autoclave body 1 and can close the opening of the autoclave body 1, an O-shaped second sealing ring 9 is arranged between the end cover 2 and the inner wall of the autoclave body 1, and the end cover 2 can realize high-pressure self-tightening sealing with the autoclave body 1 by the second sealing ring 9.

As shown in FIGS. 1 and 3, a material frame 3 is placed inside the autoclave body 1, one end of the material frame 3 is fixedly connected with an inner end of the end cover 2, and the material frame 3 is provided in a frame type structure for loading or hanging materials such as stereoscopic soles, sheet materials, other forming members, bulk particles and the like, wherein the end cover is connected with the material frame to form an integrated structure, so that entering/leaving of the material frame and opening/closing of the end cover are integrated, and thus the end cover only needs to move in one axial direction, so that the operation is simpler and more convenient; and after the cover is opened, the end cover is not required for radial avoidance movement due to the entering/leaving of the material frame, the cover opening operation is simplified, and the operation space is saved.

Preferably, the bottom of the material frame 3 may also be provided with guide wheels 14 to facilitate entering/leaving movement of the material frame 3.

As shown in FIG. 1, a heat-preservation jacket 10 can be arranged outside the autoclave body 1, a heat-preservation interlayer is formed between the heat-preservation jacket 10 and the autoclave body 1, and a heat-preservation medium inlet 11 and a heat-preservation medium outlet 12 which are respectively communicated with the heat-preservation interlayer are arranged on the heat-preservation jacket 10. Preferably, the heat-preservation medium inlet 11 may be provided at the top of one end of the autoclave body 1, the heat-preservation medium outlet 12 may be provided at the bottom of the other end of the autoclave body 1, and the heat-preservation medium may be hot water, hot oil, etc.

Further, the outside of the heat-preservation jacket 10 may be provided with a support 13 for supporting the entire foaming autoclave.

As further improvement of the embodiment, as shown in FIGS. 1 and 3, the end cover can be locked and unlocked with the autoclave body by adopting a wedge block type cover mechanism with quick unlocking and locking, the wedge block type cover mechanism with quick unlocking and locking comprises a wedge block driving device 5 and a wedge block 4, the wedge block driving device 5 is mounted at an outer end part of the end cover 2, and the wedge block driving device 5 is in transmission connection with the wedge block 4. The inner wall of the open end of the autoclave body 1 is provided with clamping grooves 8 for clamping and matching with the wedge blocks 4.

Figure 5:
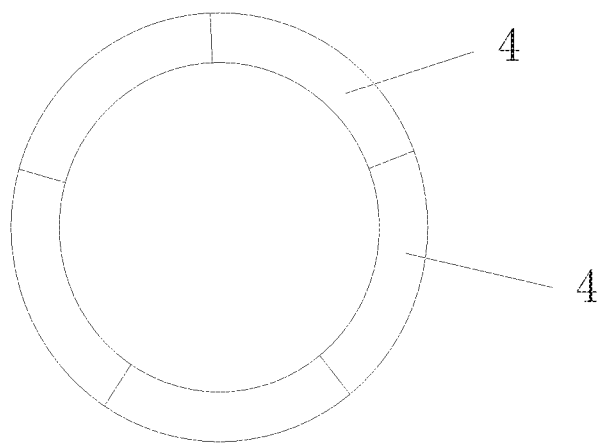
FIG. 5 is a combined state diagram of wedge blocks.

In the present embodiment, the wedge blocks 4 may preferably be provided with five ones, the wedge block driving device 5 may preferably be provided with five ones, each of the wedge blocks 4 may be respectively arranged with an arc shape, the five wedge blocks 4 may be combined to form an annular structure as shown in FIG. 5, and accordingly, the clamping grooves 8 of the autoclave body 1 may also be provided as annular clamping grooves matched therewith. The combined wedge block structure has a good locking effect. When specially implemented, the wedge block driving device 5 may preferably be provided as an air cylinder. Of course, in other embodiments, other electric driving devices or manual driving device may be used as long as the respective wedge block 4 can be driven to move in the radial direction.

After the end cover is pushed inside the open end of the autoclave body 1, the wedge block driving devices 5 can drive the corresponding wedge blocks 4 to move in the radial direction, so that the wedge blocks 4 can be clamped into the clamping grooves 8 of the autoclave body 1 to lock the end cover 2. When the cover is opened, the wedge block driving device 5 can drive the wedge block 4 to be separated from the clamping groove 8 of the autoclave body 1.

The end cover of the foaming autoclave is arranged inside the open end (at an inner diameter position) of the autoclave body. Compared with an autoclave adopting a clamp hoop type cover opening structure, the end cover is not required to adopt the same outer diameter size as the autoclave body, so that the size of the end cover is greatly reduced, and the weight is light; the wedge block type cover mechanism with quick unlocking and locking is adopted, and the wedge block driving devices can drive the corresponding wedge blocks to move in the radial direction, so that the wedge blocks can be clamped into the clamping grooves at the inner wall of the open end of the autoclave body to lock the end cover or the wedge block can be separated from the clamping groove of the autoclave body to open the cover. The structure is simple and compact, the design is reasonable, the sealing is more reliable, the end cover can be opened/closed more simply and conveniently, and the wedge blocks are mounted inside the open end of the autoclave body together with the end cover, so that installation space is saved.

The working principle of the invention is as follows.

Filling materials: the material frame and the end cover of the foaming autoclave are placed into the autoclave body together, and the wedge block driving device pushes the wedge block to lock the end cover and the autoclave body, so as to complete material filling and cover closing operations.

Pressurizing: after filling the materials, the heated high-pressure fluid (i.e. supercritical fluid) is injected into the foaming autoclave through the high-pressure fluid inlet; the pressure in the autoclave body gradually rises; and after the pressure reaches the process condition, the pressurizing is stopped.

Convection stirring: after the pressurized foaming process operation is started, the stirring driver is started; the stirring paddle drives fluid in the autoclave to generate convection circulation; and due to the fact that the stirring driver is mounted eccentrically from the axis of the autoclave body, it is more favorable to promote the fluid in the autoclave to form convection.

The horizontal polymer material supercritical fluid foaming autoclave can be applied to the industrial application field of supercritical fluid foaming of stereoscopic soles, sheets, other forming members, bulk particles and other products of polymer materials, and can also be applied to the industrial fields of supercritical fluid dyeing, supercritical fluid aerogel drying, supercritical fluid extraction, and so on.

In summary, the stirring driver can drive the stirring paddle to rotate, drive the fluid in the autoclave body to generate convection circulation, increase convection heat transfer, improve a uniform distribution degree of the temperature in the autoclave, enable the temperature in each position in the autoclave body to be consistent, ensure the consistency of the shape and parameters of foamed products, and improve the yield of the products.

The above-described embodiments are preferred embodiments of the present invention, but the implementations of the present invention are not limited to the above-described embodiments, and any other changes, modifications, replacements, combinations, and simplifications, which do not depart from the spirit and principles of the present invention, are intended to be equivalent substitutions and included within the scope of the present invention.

The invention claimed is:

1. A horizontal supercritical fluid foaming autoclave comprising an internal stirring device, an autoclave body, and an end cover; wherein the stirring device comprises a stirring driver and a stirring paddle; wherein the autoclave body is horizontally arranged, the interior of the autoclave body is hollow, one end of the autoclave body is opened to form an open end, and the other end of the autoclave body is closed to form a sealed end; the autoclave body is provided with a high-pressure fluid inlet and a high-pressure fluid outlet which are respectively communicated with the interior of the autoclave body, and the end cover is sealingly mounted inside the open end of the autoclave body to seal the open end of the autoclave body; and the stirring driver is mounted at the sealed end of the autoclave body, a stirring shaft of the stirring driver passes through the autoclave body and extends into the interior of the autoclave body, the stirring shaft is connected with the stirring paddle located inside the autoclave body, and high-pressure self-tightening sealing is realized between the stirring driver and the sealed end of the autoclave body by a first sealing ring;

wherein the stirring driver is mounted eccentrically from an axis of the autoclave body.

2. The horizontal supercritical fluid foaming autoclave according to claim 1, wherein the stirring driver is provided as a magnetic stirrer.

3. The horizontal supercritical fluid foaming autoclave according to claim 1, wherein a second sealing ring is arranged between the end cover and an inner wall of the autoclave body, and the end cover is sealingly arranged inside the open end of the autoclave body by the second sealing ring so as to realize high-pressure self-tightening sealing between the end cover and the autoclave body.

4. The horizontal supercritical fluid foaming autoclave according to claim 1, wherein a heat-preservation jacket is arranged outside the autoclave body, a heat-preservation interlayer is formed between the heat-preservation jacket and the autoclave body, and a heat-preservation medium inlet and a heat-preservation medium outlet which are respectively communicated with the heat-preservation interlayer are arranged on the heat-preservation jacket.

5. The horizontal supercritical fluid foaming autoclave according to claim 4, wherein a support for supporting is arranged outside the heat-preservation jacket.

6. The horizontal supercritical fluid foaming autoclave according to claim 1, wherein a material frame is placed inside the autoclave body and fixedly connected with an inner end part of the end cover, the material frame is a frame structure used for loading or hanging materials, and guide wheels are arranged at the bottom of the material frame.

7. The horizontal supercritical fluid foaming autoclave according to claim 1, wherein an outer end part of the end cover is provided with at least two wedge blocks and at least two wedge block driving devices, an inner wall of the open end of the autoclave body is provided with clamping grooves for clamping and matching with the wedge blocks, the wedge block driving devices are in transmission connection with the wedge blocks, and the wedge block driving devices are configured to drive the corresponding wedge blocks to move in a radial direction, so that the wedge blocks are clamped into the clamping grooves of the autoclave body when the end cover is locked or the wedge blocks are separated from the clamping grooves of the autoclave body when the end cover is opened.

8. The horizontal supercritical fluid foaming autoclave according to claim 7, wherein five wedge block driving devices are provided, each wedge block is respectively arranged with an arc shape, five wedge blocks is combinable to form an annular structure.

9. The horizontal supercritical fluid foaming autoclave according to claim 7, wherein each wedge block driving device is provided as an air cylinder.

* * * * *